US007812998B2

(12) United States Patent
Miers

(10) Patent No.: US 7,812,998 B2
(45) Date of Patent: Oct. 12, 2010

(54) METHOD OF MAKING AN ANIMATED FLIPBOOK

(76) Inventor: Jason Miers, 300 Shaes Turn, Aledo, TX (US) 76008

(*) Notice: Subject to any disclaimer, the term of this patent is extended or adjusted under 35 U.S.C. 154(b) by 931 days.

(21) Appl. No.: 11/555,586

(22) Filed: Nov. 1, 2006

(65) Prior Publication Data

US 2008/0144135 A1 Jun. 19, 2008

(51) Int. Cl.
*G06F 15/00* (2006.01)
*G06F 3/12* (2006.01)

(52) U.S. Cl. .................................... 358/1.18; 358/1.13

(58) Field of Classification Search ................ 358/1.13, 358/1.14, 1.18, 1.15, 500, 1.12
See application file for complete search history.

(56) References Cited

U.S. PATENT DOCUMENTS

| | | | | | |
|---|---|---|---|---|---|
| 259,950 | A | | 6/1882 | Van Hoevenbergh | |
| 853,699 | A | | 5/1907 | Keen | |
| 1,787,592 | A | | 1/1931 | Owens | |
| 3,168,742 | A | | 2/1965 | Chambers | |
| 3,593,432 | A | | 7/1971 | Reynolds | |
| 5,171,038 | A | | 12/1992 | Bowler | |
| 5,271,065 | A | * | 12/1993 | Rourke et al. | 382/112 |
| 5,857,209 | A | * | 1/1999 | Shively | 715/206 |
| 6,167,562 | A | * | 12/2000 | Kaneko | 717/109 |
| 6,806,974 | B1 | * | 10/2004 | Ueda et al. | 358/1.13 |
| 7,016,068 | B1 | * | 3/2006 | Gnocato et al. | 358/1.18 |
| 7,099,037 | B2 | * | 8/2006 | Clark et al. | 358/1.18 |
| 7,164,490 | B2 | * | 1/2007 | Manico et al. | 358/1.18 |
| 7,221,470 | B2 | * | 5/2007 | Takamine et al. | 358/1.15 |
| 7,345,783 | B2 | * | 3/2008 | Suzuki et al. | 358/1.18 |
| 7,426,058 | B2 | * | 9/2008 | Suzuki et al. | 358/1.18 |
| 7,460,731 | B2 | * | 12/2008 | Senftner et al. | 382/284 |
| 2002/0135808 | A1 | * | 9/2002 | Parry | 358/1.17 |
| 2003/0081260 | A1 | * | 5/2003 | Suzuki et al. | 358/302 |
| 2003/0214128 | A1 | | 11/2003 | Roberts et al. | |
| 2004/0120010 | A1 | | 6/2004 | Back et al. | |
| 2005/0088682 | A1 | * | 4/2005 | Miomo | 358/1.14 |
| 2006/0112080 | A1 | * | 5/2006 | Chen et al. | 707/3 |
| 2008/0043259 | A1 | * | 2/2008 | Triplett et al. | 358/1.9 |

* cited by examiner

*Primary Examiner*—Twyler L. Haskins
*Assistant Examiner*—Jonathan R Beckley
(74) *Attorney, Agent, or Firm*—James R. Gourley; Carstens & Cahoon, LLP

(57) ABSTRACT

The present invention is directed towards method of making an animated flipbook by printing individual images captured from video footage on sheets of paper, with more than one image printed on each sheet of paper in a predetermined order. The sheets of paper are cut into rows of images, stacked chronologically, and cut into individual flipbook pages. The flipbook pages are stacked chronologically and bound together.

7 Claims, 17 Drawing Sheets

METHOD OF MAKING AN ANIMATED FLIPBOOK

BACKGROUND OF THE INVENTION

Video is a technology that captures a series of sequential images over a period of time, and reproduces the images in the same order they were captured to simulate motion. Video footage can be characterized according to its frame rate, which is the number of still images captured or shown per unit of time. Video footage can be captured or recorded on film or digital media, and is typically played back using a projector, television, or computer monitor. Like photographs, video is primarily used as a means of communication between people.

One of the drawbacks to reproducing video footage using a projector, television or computer monitor is that such reproduction typically requires bulky, specialized equipment and electricity. By contrast, an animated book, or flipbook, can display video footage without any special bulky equipment or electricity. A flipbook is a book that has sequential images contained on each successive page such that when the pages are flipped by a user in rapid succession from the first page to the last page, it creates the illusion of motion. The flipping pages create the illusion of motion by causing each image to be visible to the user for a short period of time and quickly replacing it with the next image.

Although viewed without using bulky equipment or electricity, flipbooks are limited by the maximum page size that allows the pages to flip fast enough to recreate motion. Consequently, flipbook images in the prior art are created by printing images sequentially, one by one, on non-standard sizes of paper (usually much smaller than standard 8.5 inch by 11 inch paper) using specialized printing equipment, which drives up the cost. A need therefore exists for a method of quickly and easily creating flipbooks using standard, readily available equipment.

SUMMARY OF THE INVENTION

The present invention is thus directed towards a method for creating a flipbook inexpensively and quickly using standard, readily available equipment. Specifically, this invention is a method for creating a flipbook using a video camera, a computer running a computer program, a printer, a business card slitter, and a stapler. The ability to create flipbooks using standard readily available equipment means that the method of this invention is broadly applicable. The method of the present invention can be practiced by non-technical people, in many different locations and at many different social gatherings, including malls, shopping centers, military bases, weddings, and parties. In so doing, it provides a creative, convenient, fast and easy way to create novelty items or gifts that convey personal and complex messages. The flipbooks created using the method of the present invention can also be used as creative and inexpensive advertising materials.

In the preferred embodiments of the present invention, a computer and video camera are used to capture a pre-determined length of video footage. A computer program running on the computer then analyzes the captured video images and differentiates between book images, which will be part of the flipbook, and skipped images, which will not be part of the flipbook.

One novel feature of this invention is that the book images are printed on standard 8.5×11 sheets of paper using a standard printer, with multiple book images being printed on each sheet of paper. Another novel feature of this invention is the order in which the book images are printed on each sheet of paper. As described in more detail below, the book images are printed in a specific order and orientation relative to each other that allows them be easily stacked in such a way that the book images are in the correct order after the sheets of paper are cut into individual frames.

In order to produce a final stack of flipbook pages according to one preferred embodiment, each book image is printed within its own individual frame, measuring 2 inches by 3.5 inches, on the sheet of paper. Once all of the book images are printed in the correct order on each sheet of paper, the sheets of paper are initially stacked, cut into rows of book images, stacked again, and then cut into individual flipbook pages that are the size of a standard business card, 2 inches by 3.5 inches. Both cuts are performed using a business card slitter.

The stacking and cutting method of this invention is yet another novel feature. Initially, in a preferred embodiment, the book images are printed on a number of sheets of 8.5 inch by 11 inch paper with either 10 or 12 individual book images printed on each sheet. Again, to cut the sheets of paper down to 2 inch by 3.5 inch flipbook pages, the initial stack is passed through the business card slitter twice and re-stacked twice. The details of each cutting and stacking step depend on the order and number of book images printed on each sheet of paper, and are described in more detail below. In summary, the book images are printed in such an order, and the sheets of paper are stacked in such a way, that the first book image chronologically is printed on the sheet of paper on the top of the stack, and each subsequent book image is either printed on the sheet of paper on the top of the stack or printed on a different sheet of paper within the stack at a location directly beneath and adjacent to the book image immediately preceding it chronologically.

Once the individual book images are cut and stacked in the correct order, an optional cover is placed over the front and back of the stack of flipbook pages. Finally, the flipbook pages are bound together.

BRIEF DESCRIPTION OF THE DRAWINGS

A more complete understanding of the method of the present invention may be had by reference to the following detailed description when taken in conjunction with the accompanying drawings, wherein.

Figure 1:
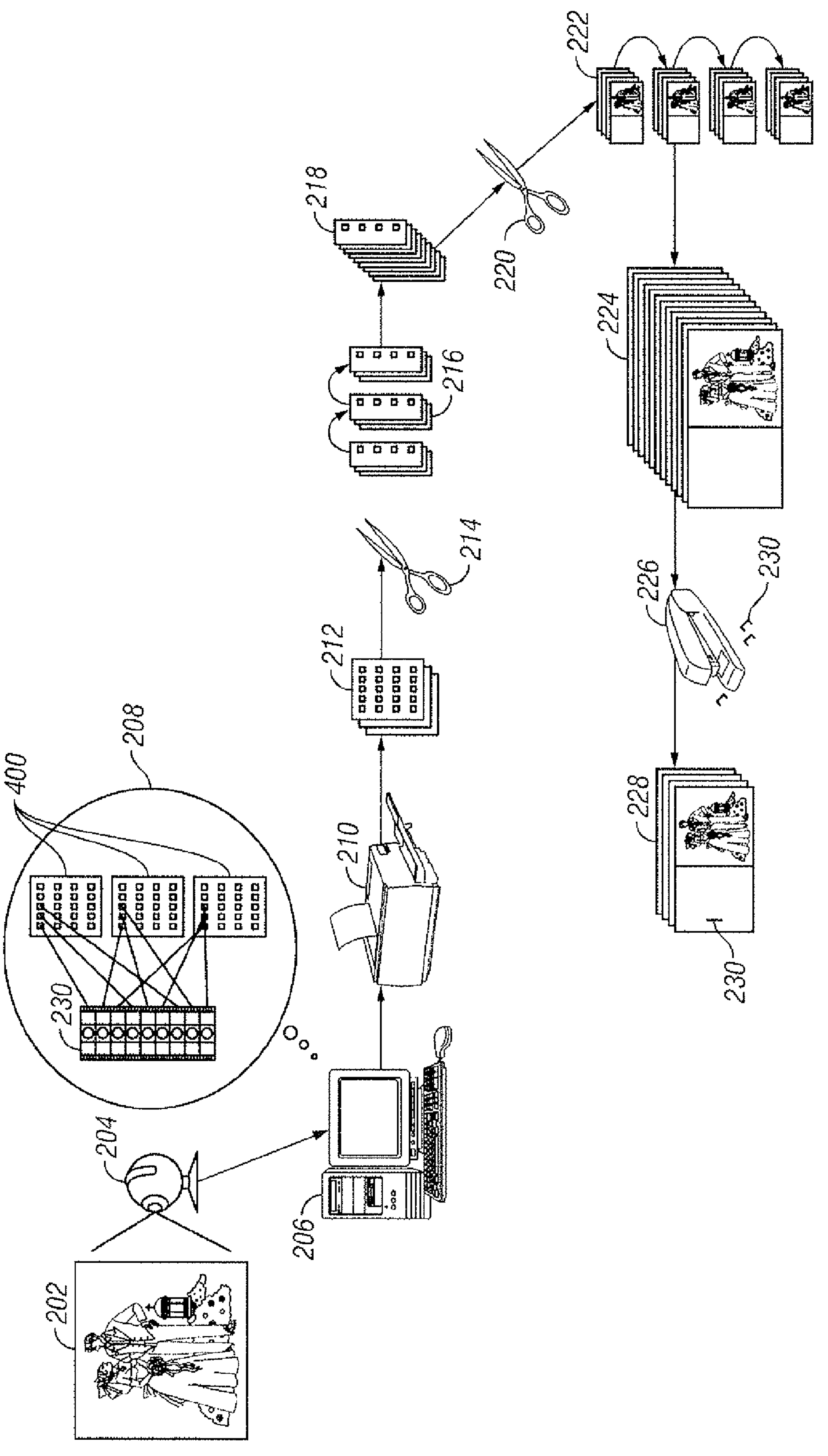
FIG. 1 is a graphical overview depicting each of the steps of the present invention.
Figure 2A:
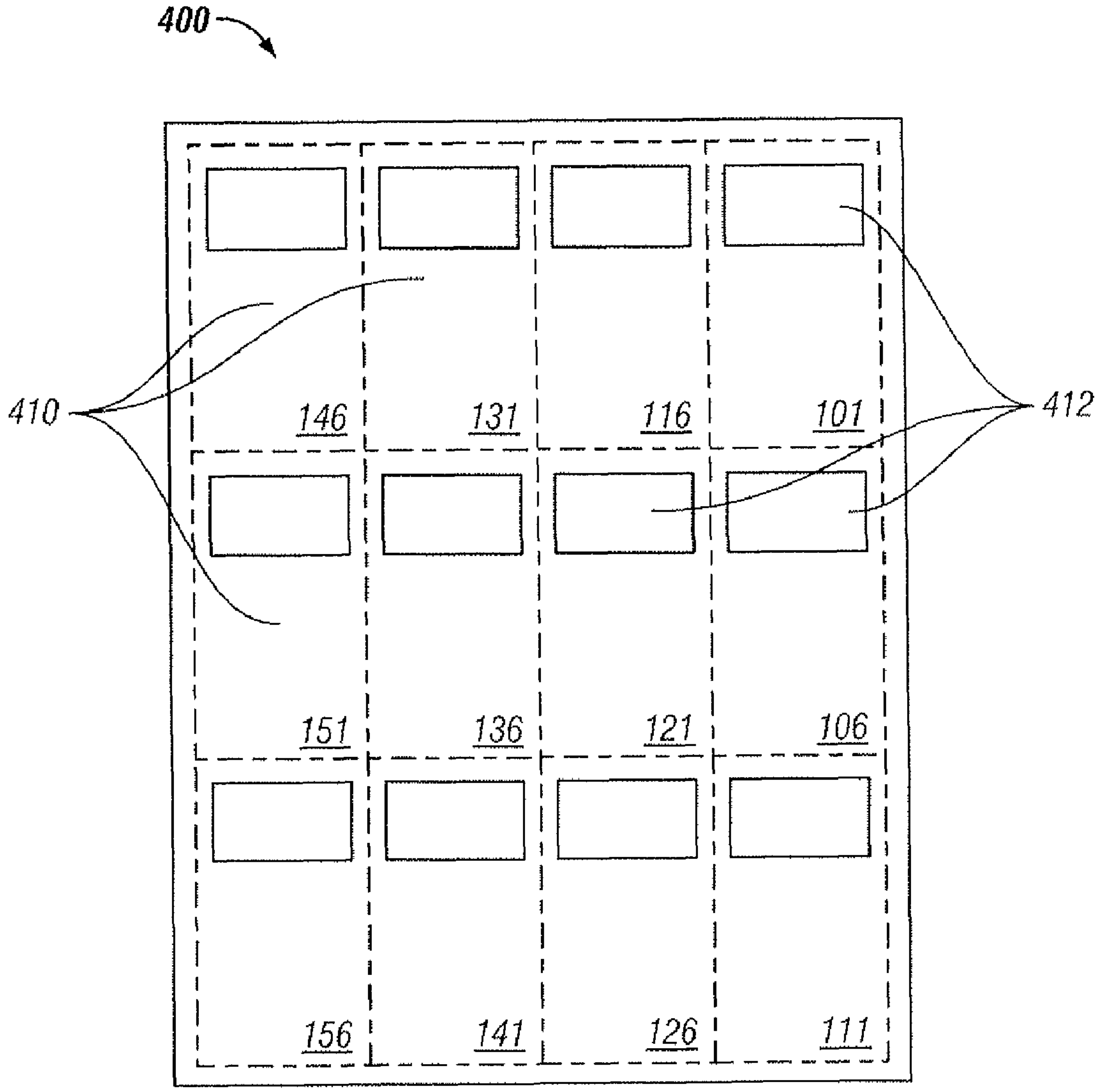
FIGS. 2A-2E each depict an individual uncut sheet of one preferred embodiment of the present invention.
Figure 2B:
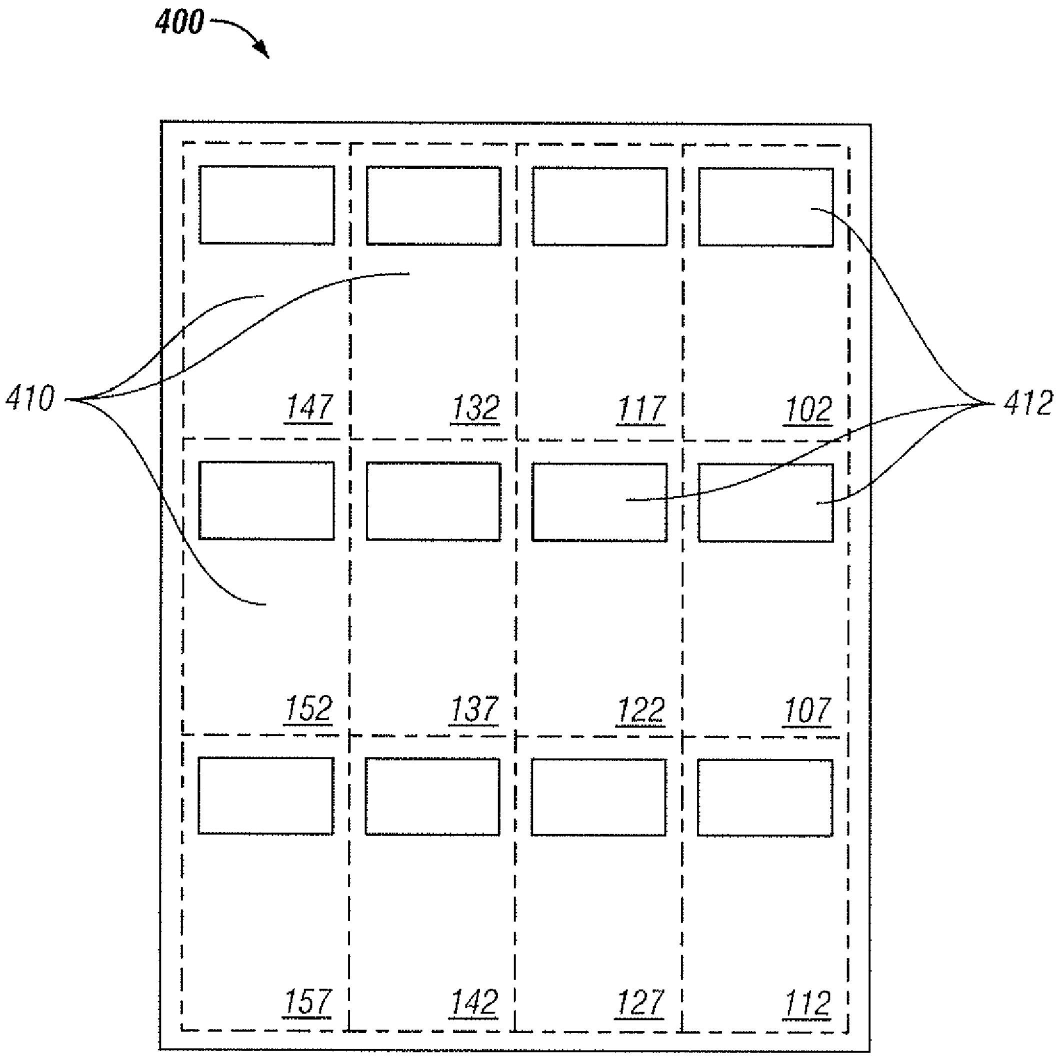
Figure 2C:
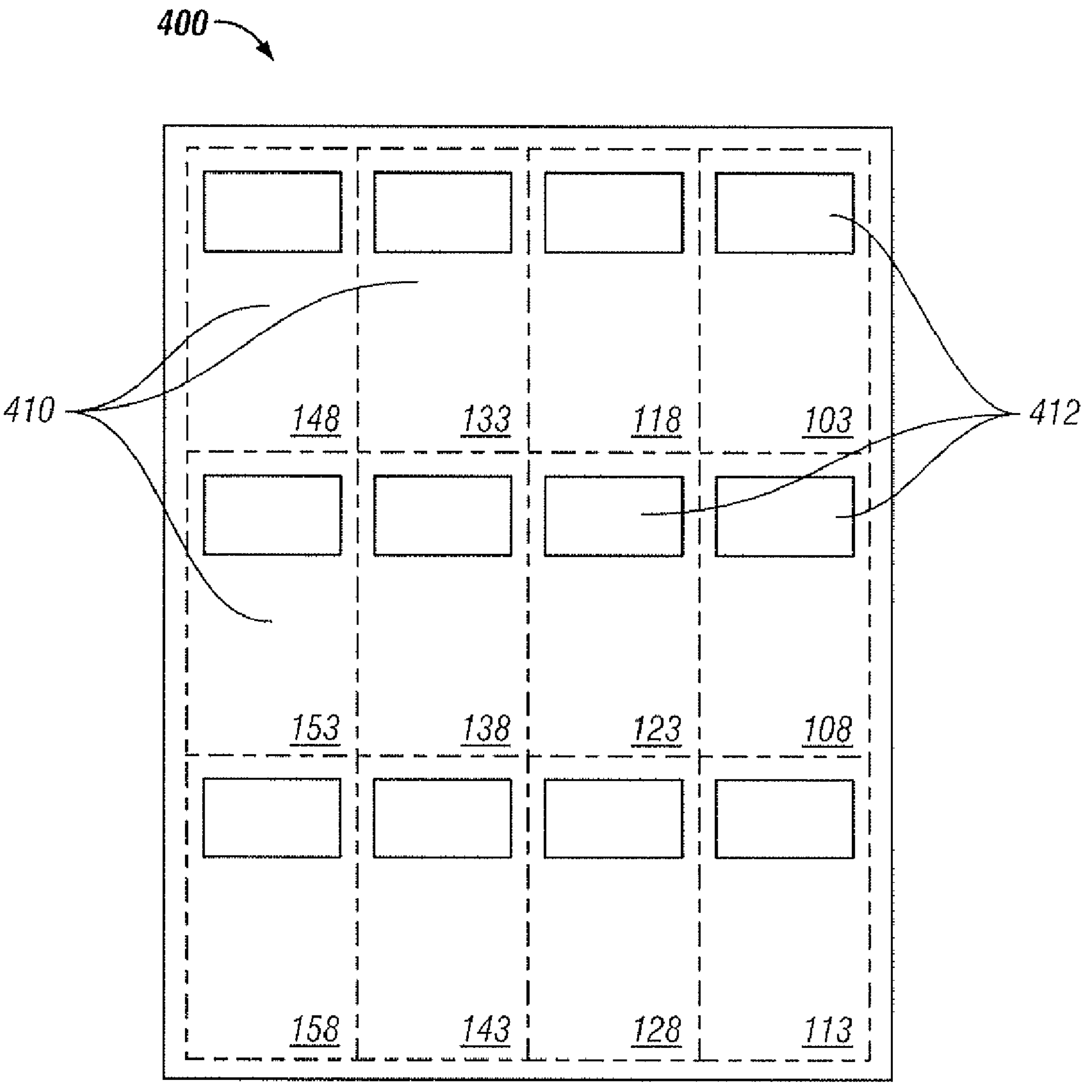
Figure 2D:
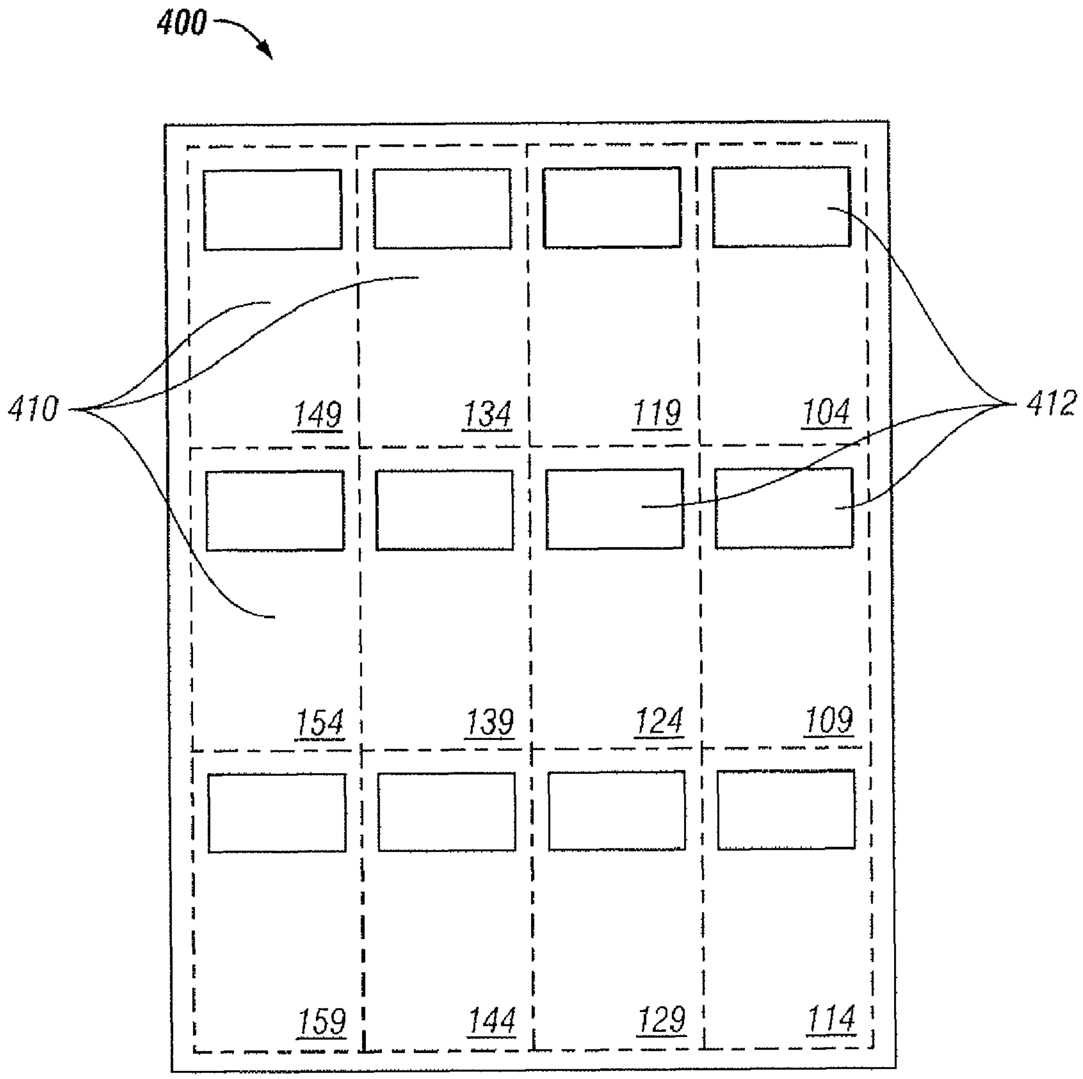
Figure 2E:
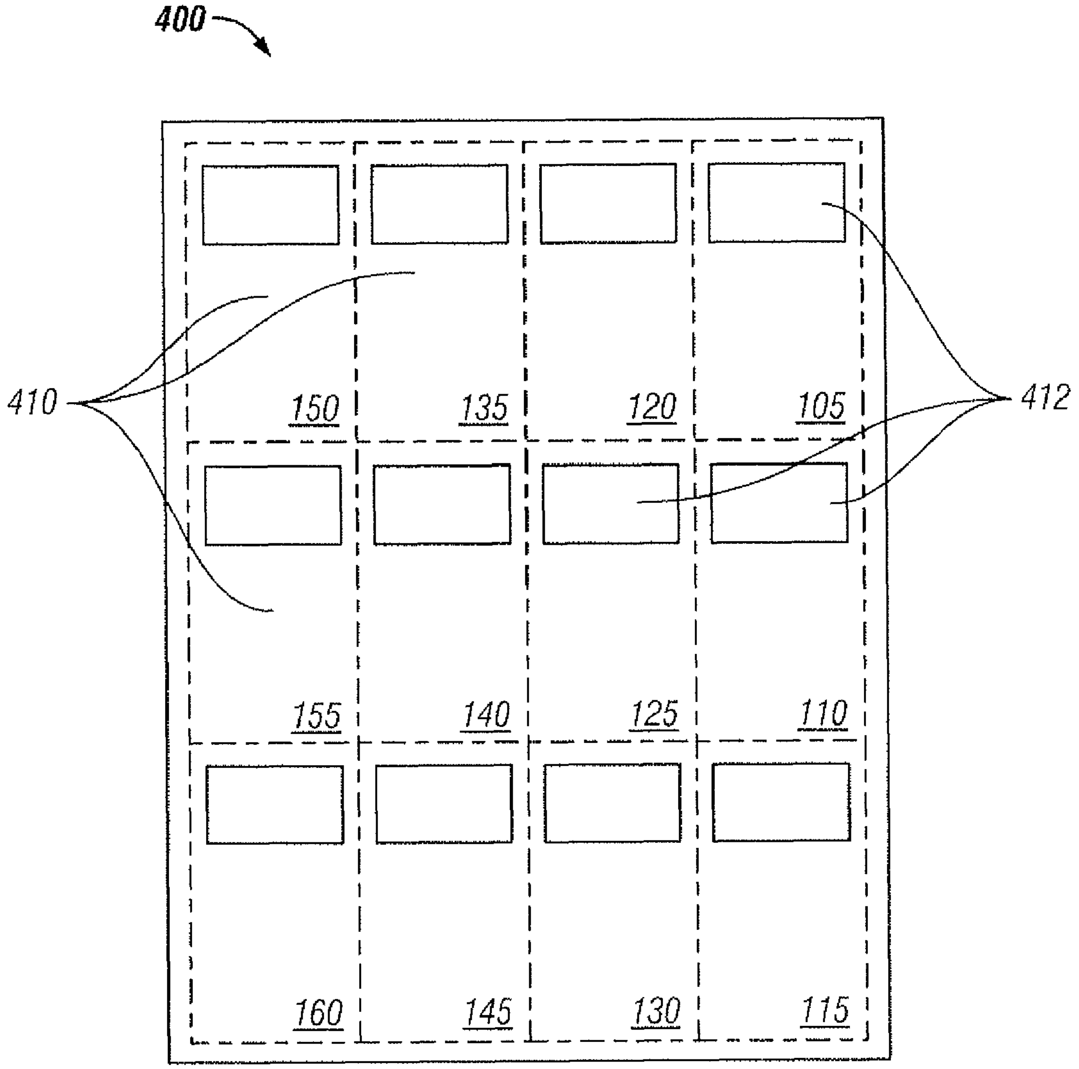

Where used in the various figures of the drawing, the same numerals designate the same or similar parts. Furthermore, when the terms "top,". "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

The present invention is directed towards a method for creating an animated book, or flipbook using standard, readily available equipment, a novel printing method and a novel cutting and stacking method. The term flipbook, as used herein, means a stack of at least two pages, bound at or near one edge of the stack, with each page containing one image. The images on each successive page of the flipbook are slightly altered from the previous image so as to simulate motion. The present invention contemplates using captured images from video footage over a time interval to reproduce the video footage. The present invention also contemplates using partially overlapping sections of one or more panoramic photographs for each flipbook image.

Referring initially to FIG. 1, therein is depicted a graphical overview of the present invention. First, the video camera 204 connected to a computer 206 records or captures video footage over a pre-determined time interval of a moving subject 202. The moving subject 202 can be, as depicted in FIG. 1 for example, a man and a woman dancing. The video camera 204 is preferably a commercially available webcam that allows the user to capture video footage 230 at user-defined frame rates. The preferred frame rate is 10 frames per second, but can vary from 5 frames per second to 50 frames per second. The preferred frame rate is 10 frames per second because, as described in more detail below, the present invention preferably prints 10 or 12 images per sheet of paper, and preferably prints 50 or 60 images total divided among 5 sheets of paper. Thus, the preferable time interval for recording video footage according to the present invention is between about 5 and about 6 seconds.

A computer program 208 running on the computer 206 then analyzes and sorts the captured images that make up the video footage 230. If the video camera is not able to capture video footage at user defined frame rates, the computer program can optionally alter the captured video footage by selectively removing captured images in order to obtain the desired frame rate. The captured images that are printed in the flipbook are hereinafter referred to as book images, and the captured images that are not printed in the flipbook are referred to herein as skipped images. If the video camera is able to capture video footage at user defined frame rates, all of the captured images are book images. If the video footage is not able to capture video footage at user defined frame rates, the computer program can optionally be used to alter the frame rate by designating a user defined number of frames per second of the captured images as the book images, with each book image used per second being approximately evenly dispersed over each second of video footage.

The computer program 208 then causes a printer 210 to print the book images on sheets of 8.5×11 inch paper, with multiple book images printed on each sheet in a specific order. The sheets of 8.5×11 paper with multiple book images are hereinafter referred to as uncut sheets 400. The arrangement of the book images on each uncut sheet 400 will be considered in more detail below. After they are printed, the uncut sheets 400 are stacked on top of one another to produce an initial lot of uncut sheets 212. The initial lot 212 is then cut 214 (using what is referred to herein as a row cut) to produce at least two lots of rowcut sheets. Each rowcut sheet contains a single row of images. Each lot of rowcut sheets produced by the row cut 214 is hereinafter referred to as an initial rowcut sheet lot 216. The initial rowcut sheet lots 216 are then stacked on top of one another to produce a final rowcut sheet lot 218. The final rowcut sheet lot 218 is cut 220 (using what is referred to herein as a final cut) to produce initial frame lots 222. The initial frame lots are then stacked on top of one another to produce a final frame lot 224. The final frame lot 224 is then bound together at one end, preferably using a stapler 226, to produce a flipbook 228.

The arrangement of the book images on each uncut sheet 400 and the specific stacking and cutting methods used will now be considered in detail with reference to the FIGS. 2A-2E, 3, 4 and 5 for one preferred embodiment, and FIGS. 6A-6E, 7, 8 and 9 for another preferred embodiment.

Referring to FIGS. 2A-2E, therein is depicted part of one embodiment of the present invention, which produces a flipbook by printing book images in as many as 12 frames on each uncut sheet 400. The particular embodiment depicted in FIGS. 2A-2E creates a flipbook containing 60 book images, divided among 5 uncut sheets. If the video footage is captured at or reduced to the preferred rate of 10 frames per second, the flipbook produced by the first preferred embodiment will display about 6 seconds of video footage. Although FIGS. 2A-2E depict a flipbook with 60 pages, it is understood that this embodiment of the present invention can be used to create flipbooks having as few as 2 pages and as many as 120 pages.

As depicted in FIGS. 2A-2E, each uncut sheet 400 is divided into 12 frames 410 arranged side by side, forming 3 rows and 4 columns. Each frame 410 is the size of a standard business card, having a width of 2 inches and a length of 3.5 inches. Each book image 412 is printed inside one of the frames 410, preferably located near one of the short edges of the frame 410. It is understood that if the book images 412 are printed off center, every book image 412 must be printed in approximately the same position relative to the edges of its frame 410 in order to consistently reproduce the video footage in the flipbook.

The arrangement of the book images 412 on each uncut sheet 400 for a 60 page flipbook is depicted in FIGS. 2A-2E, with the reference numeral 101 referring to the frame 410 containing the first book image (the first page of the flipbook) and the reference numeral 160 referring to the frame 410 containing the last book image (the last page of the flipbook).

The location of each frame 410 on each uncut sheet 400 is understood by the computer program 208 as having an X position, a Y position and a Z position, or (X,Y,Z) coordinates. The value of the X coordinate for each frame 410 refers to the row in which the frame 410 can be found, and is an integer ranging from 1 to 3, inclusively. Row 1 is next to row 2, which is next to row 3. The value of the Y coordinate refers to the column in which the frame 410 can be found, and is an integer ranging from 1 to 4, inclusively. Column 1 is next to column 2, which is next to column 3, which is next to column 4. The value of the Z coordinate refers to the uncut sheet 400 upon which the frame 410 can be found, and is an integer ranging from 1 to the total number of uncut sheets used for the particular flipbook, inclusively. The Z coordinate value associated with the top uncut sheet is 1, and the Z coordinate value associated with the uncut sheet directly beneath the top uncut sheet is 2, and so on until the bottom uncut sheet is associated with the maximum value of Z. The total number of uncut sheets needed for a particular flipbook is calculated by dividing the total number of flipbook pages by 12 and rounding up to the next whole number. With reference to FIGS. 2A-2E, the 60 page flipbook depicted therein requires 5 uncut sheets, which means 5 is the maximum value for the Z coordinate for any flame 410 in these figures.

The computer program 208 also designates an (X,Y,Z) coordinate for each book image 412. First, the (X,Y,Z) coordinates of the first book image are designated as (1,1,1). Next, (X,Y,Z) coordinates are assigned to each successive book image in chronological order by the computer program 208 using embedded loop calculations.

The value of the Z coordinate of each successive book image is calculated by adding 1 to the value of the Z coordinate of the previous book image. However, because the computer program 208 has calculated the total number of uncut sheets based on the total number of flipbook pages, every time adding 1 to the value of the Z coordinate of the previous book image would make the value of the Z coordinate for a particular book image greater than the total number of uncut sheets used for the flipbook, the value of the Z coordinate for that particular book image is reset to 1. Thus, the process of adding 1 to the value of the Z coordinate of the previous book image, and resetting the value of the Z coordinate to 1 every time adding 1 to the value of the Z coordinate of the previous book image would yield a Z coordinate value greater than the total number of uncut sheets, repeats for each successive book image in the flipbook after the first book image. This loop comprises the first loop.

With reference to FIGS. 2A-2E, for book images 2 through 60, the first embedded loop calculates the value of the Z coordinate for each book image by adding 1 to the Z coordinate value of the previous book image, and resetting value of the 7 coordinate to 1 every time adding 1 to the Z coordinate value of the previous book image would yield a Z coordinate value of 6 for a particular book image.

In a similar fashion, every time computer program 208 resets the Z coordinate value of a particular book image to 1, it increases value of the X coordinate of the same book image by 1 over the X coordinate value of the previous book image. If the Z coordinate value of a particular book image is increased by 1 then the value of the X coordinate of the same particular book image is made equal to the X coordinate value of the previous book image. Because there are only 3 rows of frames on each uncut sheet in this embodiment, every time adding 1 to the value of the X coordinate of the previous book image would yield an X coordinate value of 4 for a particular book image, the value of the X coordinate for that same particular book image is reset to 1. Thus, the process of adding 1 to the value of the X coordinate of the previous book image every time the value of the Z coordinate for a particular book image is reset to 1, setting the value of the X coordinate for a particular book image equal to the value of the X coordinate value of the previous book image every time the value of the Z coordinate for the same particular book image is increased by 1, and resetting the value of the X coordinate for a particular book image to 1 every time adding 1 to the X coordinate value of the previous book image would yield an X coordinate value of 4 for the same particular book image, repeats for each successive book image in the flipbook. This loop comprises the second loop.

In the same way, every time computer program 208 resets the value of the X coordinate of a particular book image to 1, it increases value of the Y coordinate of the same particular book image by 1 over the Y coordinate value of the previous book image. If the X coordinate value of a particular book image is increased by 1, the value of the Y coordinate of the same particular book image is made equal to the Y coordinate value of the previous book image. Thus, the process for each particular book image of adding 1 to the value of the Y coordinate of the previous book image every time the value of the X coordinate for the same particular book image is reset to 1, setting the value of the Y coordinate for a particular book image equal to the value of the Y coordinate of the previous book image every time the value of the X coordinate for the same particular book image is increased by 1, repeats for each successive book image in the flipbook. This loop comprises the third loop.

By performing the three foregoing loop calculations on each successive book image after the first book image in chronological order, the first loop is nested inside the second loop, which is nested inside the third loop. The computer program 208 uses this nested loop structure to progressively assign each successive book image after the first book image an (X,Y,Z) coordinate. Once (X,Y,Z) coordinate values are assigned to each book image, each book image is printed on an uncut sheet 400 in the particular frame having (X,Y,Z) coordinate values that correspond to the particular book image (X,Y,Z) coordinate values. For example, a book image that is assigned (X,Y,Z) coordinate values of (2,1,2) is printed inside the frame that has (X,Y,Z) coordinate values of (2,1,2). Preferably, all of the book images having equal Z coordinate values are printed at the same time on the same uncut sheet 400. The position of each particular book image 412 inside the frames 410 on each uncut sheet 400 is determined by the values of its X and Y coordinates.

Next, the uncut sheets 400 must be stacked, cut, stacked a second time, cut a second time, and stacked a third time to produce a final stack of book images in chronological order. Because the frames 410 on each uncut sheet 400 are the dimensions of a standard business card, 2 inches by 3.5 inches, a business card slitter is used to cut the uncut sheets 400. Because this embodiment utilizes 12 frames 410 on each uncut sheet 400, a Martin Yale model BCS212 Tabletop Business Card Slitter is preferably used.

In order to create a flipbook using the uncut sheets with book images printed on them, the first step is the initial stacking process, which produces an initial lot of uncut sheets 212. The initial stacking process produces an initial lot of uncut sheets 212 in the following order: the uncut sheet containing the first book image is on top; the uncut sheet containing the second book image is directly under it; the uncut sheet containing the third book image is directly under the uncut sheet containing the second book image; and so on until all of the uncut sheets are stacked one on top of the other. Also, the uncut sheets in the initial lot must be oriented relative to each other such that each book image that is not printed on the top uncut sheet is located directly below the book image immediately preceding it chronologically. Thus, the uncut sheet containing the second image is directly under the uncut sheet containing the first book image, and the two sheets are aligned such that the second book image is directly underneath the first book image.

Figure 3:
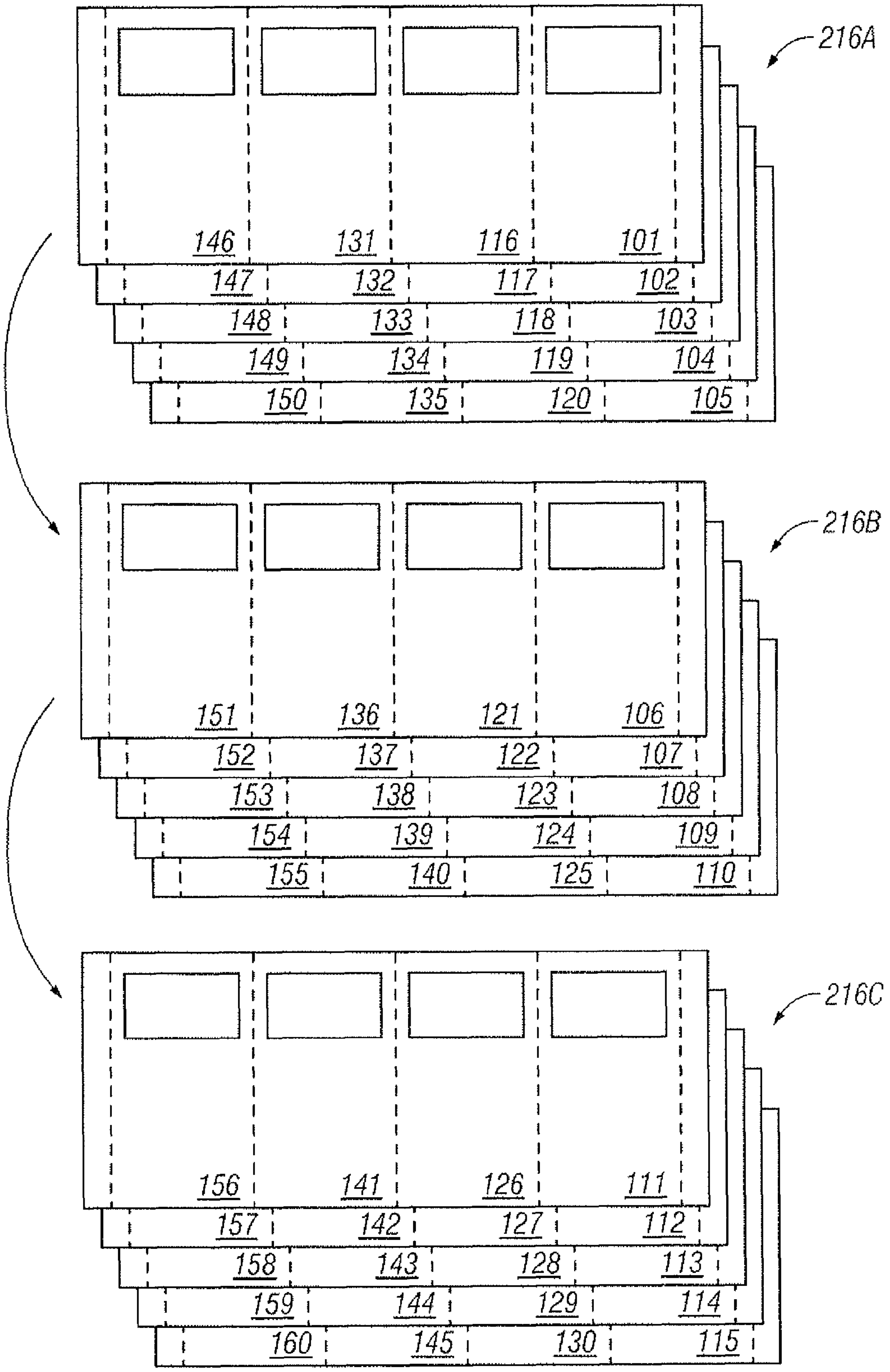
FIG. 3 shows the initial lots of rowcut sheets of one preferred embodiment of the present invention and the stacking order.

Referring next to FIG. 3, the initial lot of uncut sheets is cut using a row cut. The row cut separates the rows of frames on the uncut sheets into individual rowcut sheets, with each rowcut sheet being 3.5 inches by 8.5 inches and containing a row of book images. Each stack of rowcut sheets produced by the row cut is an initial rowcut lot 216A-216C.

Figure 4:
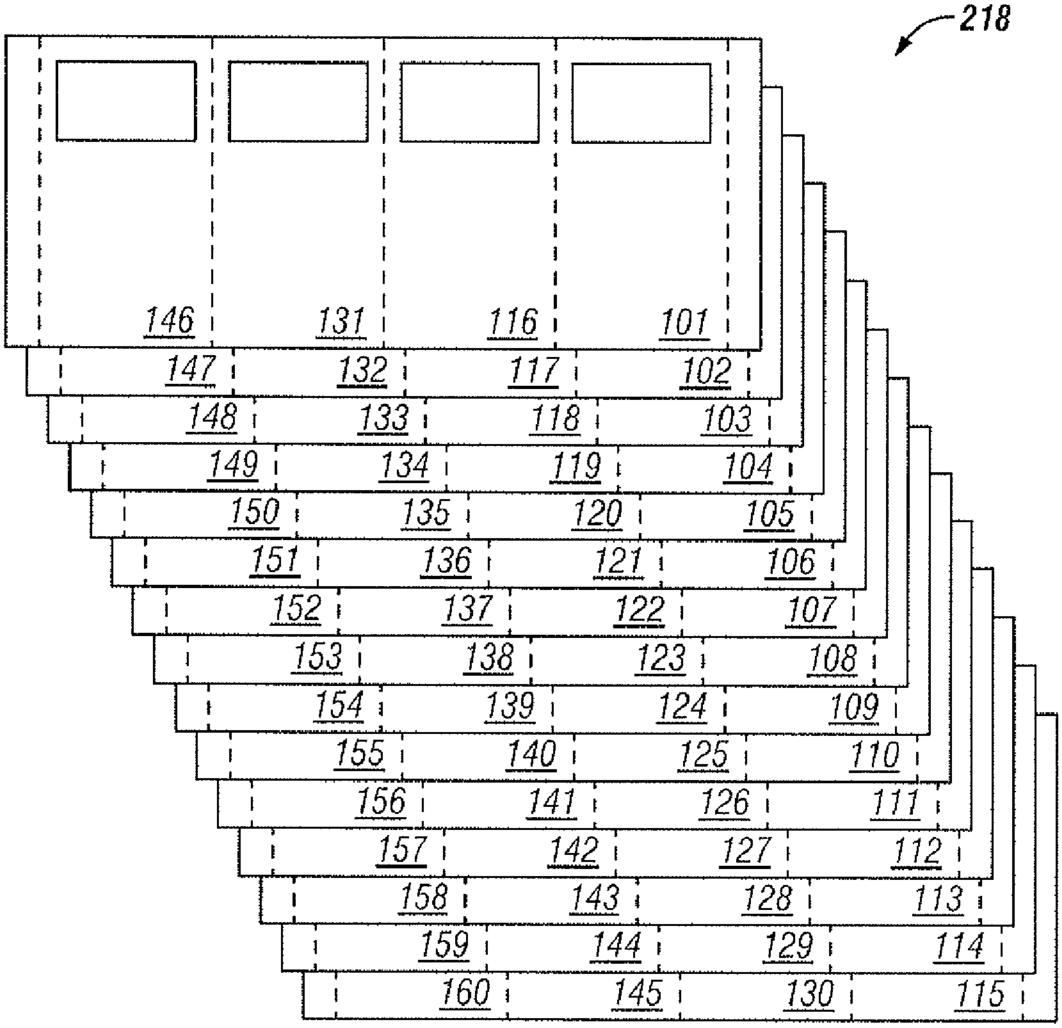
FIG. 4 depicts the final lot of rowcut sheets of one preferred embodiment of the present invention.

Referring to FIGS. 3 and 4, the initial rowcut lots 216A-216C undergo a second stacking process, which produces a final rowcut lot 218. The rowcut sheets in the final rowcut lot 218 are in an order and orientation relative to each other such that the rowcut sheet containing the first book image is on the top of the lot 218, and for every rowcut sheet not on top, each book image is located directly underneath the book image that immediately precedes it chronologically. Generally, this second stacking process involves placing each initial rowcut lot 216A-216C on top of the initial rowcut lot next to it, with the initial rowcut lot having the earliest book image chronologically 216A on top.

Figure 5:
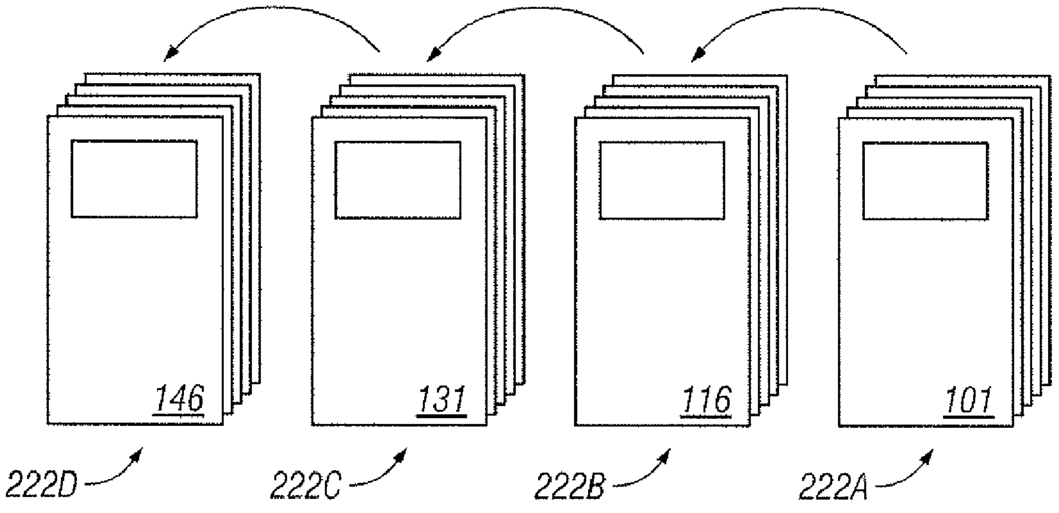
FIG. 5 shows the initial lots of individual frames of one preferred embodiment of the present invention and the stacking order.
Figure 6A:
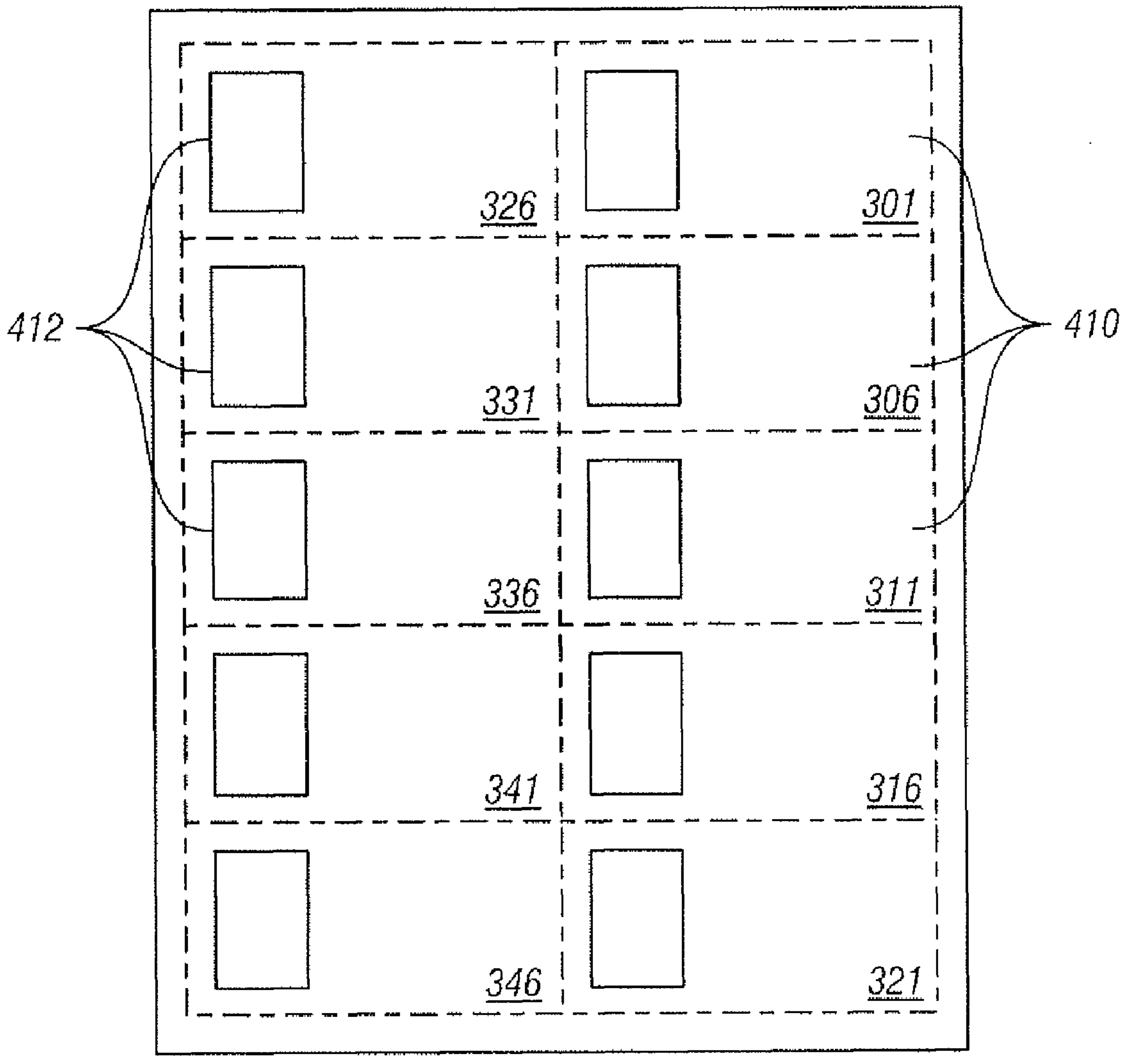
FIG. 6A-6E each depict an individual uncut sheet of another preferred embodiment of the present invention.
Figure 6B:
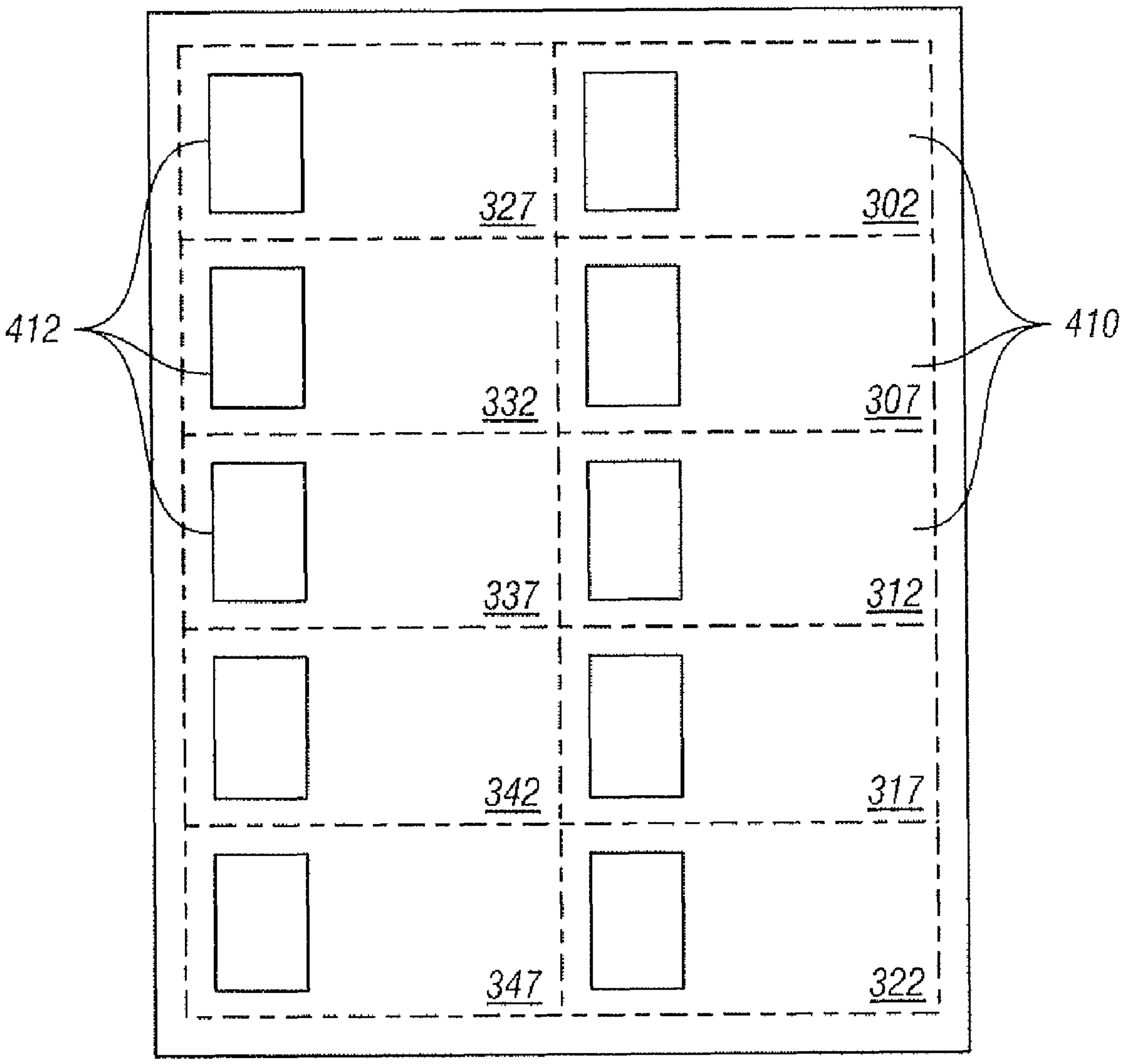
Figure 6C:
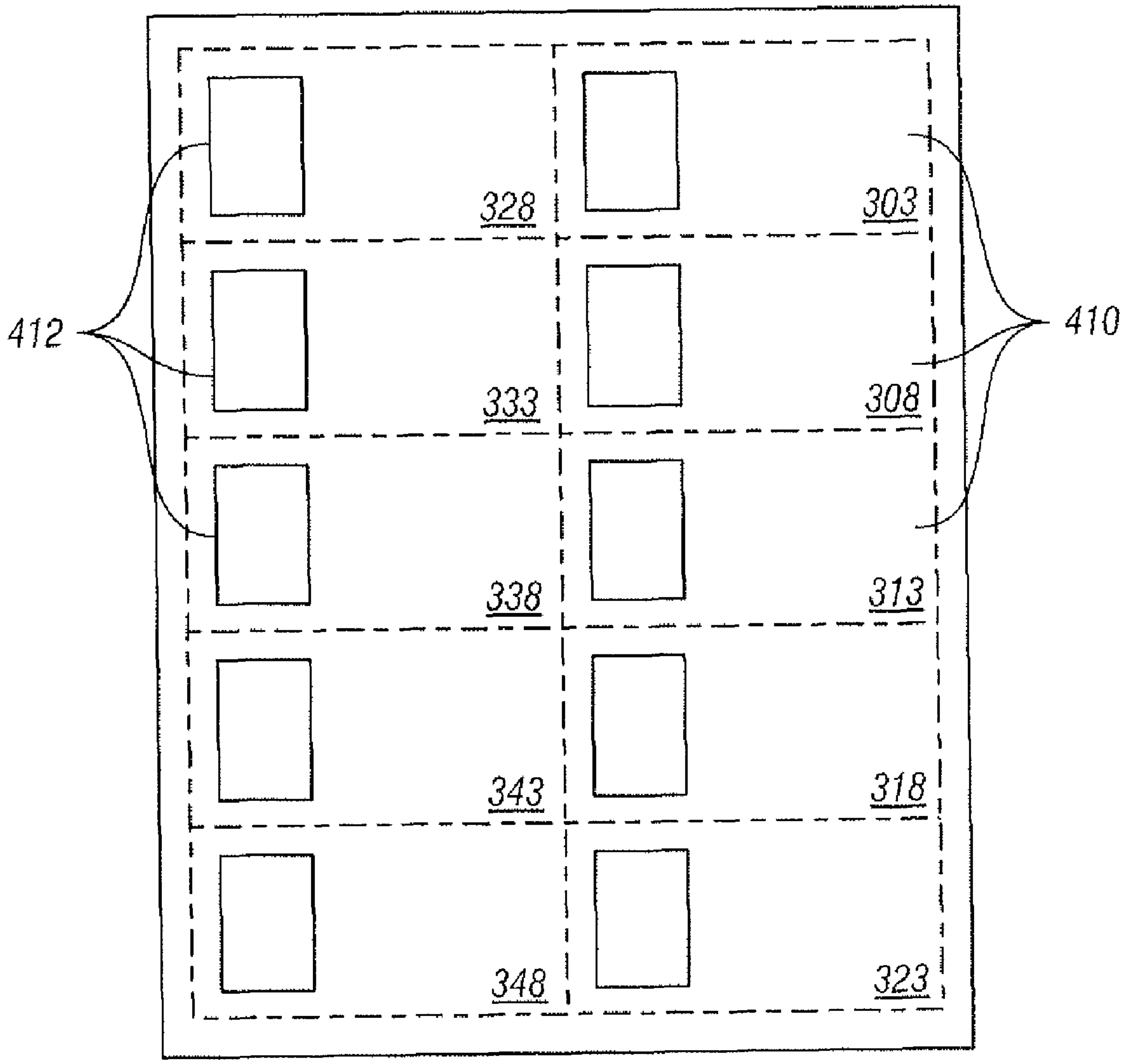
Figure 6D:
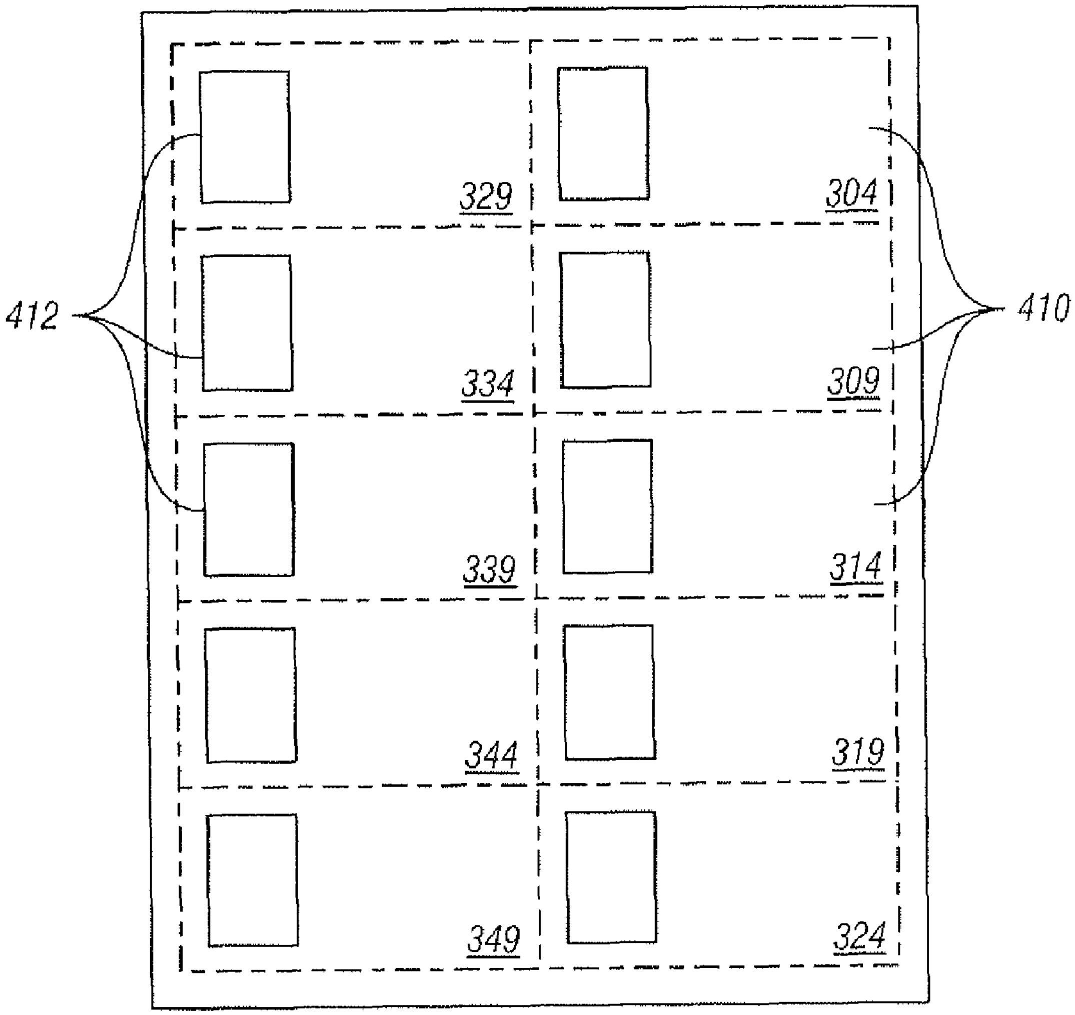
Figure 6E:
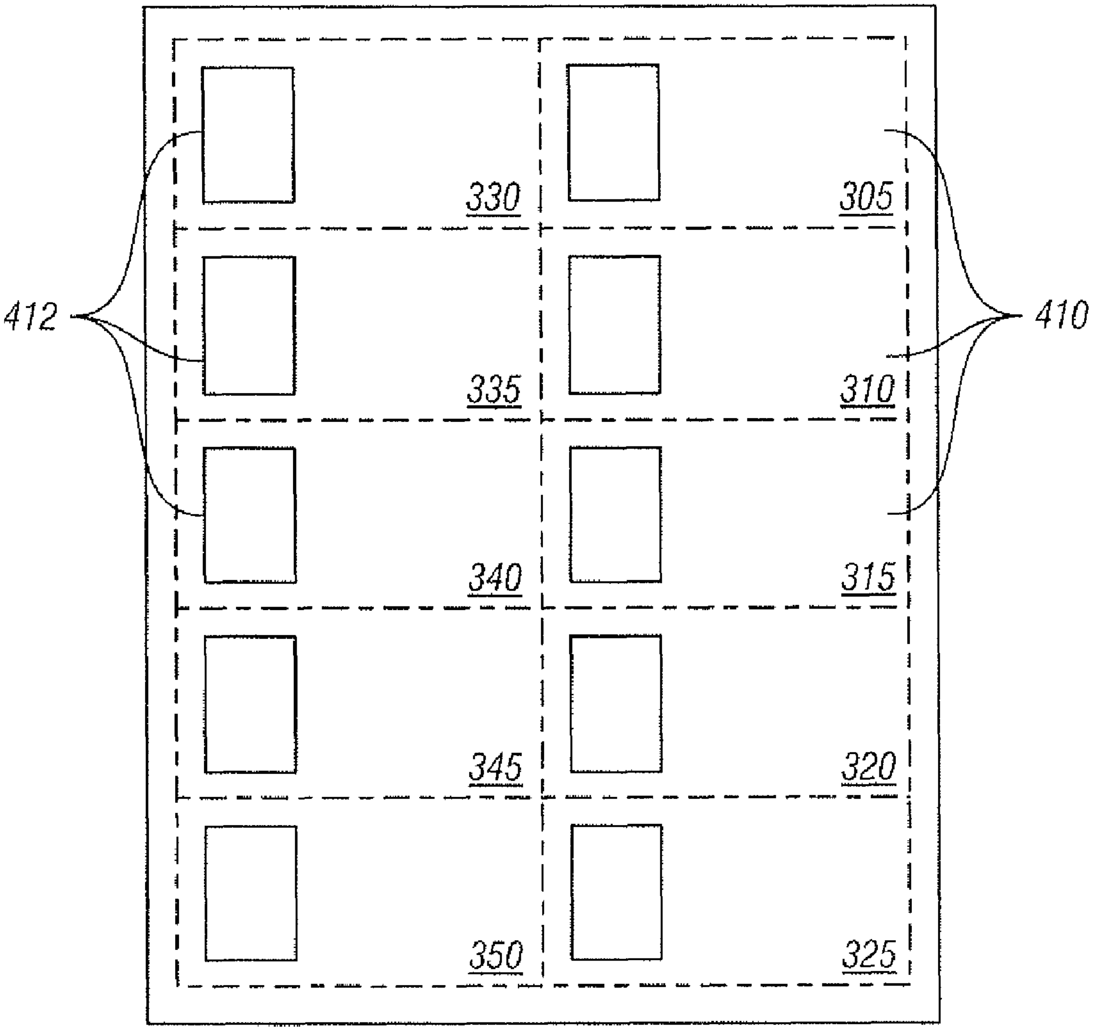

Referring to FIGS. 4 and 5, the final rowcut lot 218 undergoes a final cut. The final cut separates the rowcut sheets into individual frames, with each frame being the size of a standard business card, or about 2 inches by about 3.5 inches, and with each frame containing a single book image. Each stack of individual frames produced by the final cut is an initial frame lot 222A-222D.

Referring to FIGS. 1 and 5, the initial frame lots 222A-222D undergo a final stacking process, which produces a final frame lot 224. The individual frames in the final frame lot 224 are in an order such that the book images on each frame are in chronological order, with the first book image on top and the last book image on the bottom. The individual frames in the final frame lot 224 must also be similarly oriented relative to each other, with the book image on each frame near the same edge. Again, this final stacking process generally involves placing each initial frame lot 222A-222D on the initial frame lot next to it, with the initial frame lot having the earliest book image chronologically 222A on top.

A cover (not shown) can optionally be placed over the top and bottom of the final frame lot 224 before binding. Finally, the final frame lot 224 is bound together near the edge opposite the book images, preferably using staple 230 from a stapler 226 to produce a flipbook 228. Binding can also be accomplished using perfect binding, or other types of binding known in the art.

Referring next to FIGS. 6A-6E, therein is depicted part of another preferred embodiment of the present invention, which produces a flipbook by printing book images in as many as 10 frames 410 on each uncut sheet 400. The particular embodiment depicted in FIGS. 6A-6E creates a flipbook containing 50 book images 412, divided among 5 uncut sheets 400. If the video footage is captured at or reduced to the preferred rate of 10 frames per second, the flipbook produced by this embodiment will display about 5 seconds of video footage. Although FIGS. 6A-6E depict an embodiment for a flipbook with 50 pages, it is understood that the present invention can be used to create flipbooks having as few as 2 pages and as many as 110 pages.

As depicted in FIGS. 6A-6E, each uncut sheet 400 is divided into 10 frames 410 arranged side by side, forming 5 rows and 2 columns. Each frame 410 is the size of a standard business card, having a width of about 2 inches and a length of about 3.5 inches. Each book image 412 is printed inside one of the frames 410, preferably located near one of the short edges of the frame 410. It is understood that if the book images 412 are printed off center, each book image 412 must be printed in approximately the same position relative to the edges of its frame 410 in order to consistently reproduce the video footage in the flipbook.

The arrangement of the book images 412 on each uncut sheet for a 50 page flipbook is depicted in FIGS. 6A-6E, with the reference numeral 301 referring to the frame containing the first book image (the first page of the flipbook) and the reference numeral 350 referring to the frame containing the last book image (the last page of the flipbook).

The position of each frame 410 on each uncut sheet 400 is identified with (X,Y,Z) coordinate values, with X, Y and Z values referring to the row position for the frame, column position for the frame, and uncut sheet that contains the frame, respectively. In the second preferred embodiment, the value of the X coordinate for any particular frame is an integer and can range from 1 to 5, inclusively. Likewise, the value of the Y coordinate for any particular frame is an integer and can range from 1 to 2, inclusively. The value of the Z coordinate for any particular frame is an integer, and can range from 1 to the total number of uncut sheets used to create the flipbook. The total number of uncut sheets is calculated by dividing the total number of flipbook pages by 10 and rounding up to the nearest whole number.

In this preferred embodiment, the three embedded loops function similar to the embedded loops used in the preferred embodiment depicted in FIGS. 2A-2E, 3, 4 and 5. The only difference between the previous preferred embodiment and this preferred embodiment is that, inside the second loop, every time that calculating the X coordinate value for a particular book image by adding 1 to the X coordinate value of the previous book image would yield 6, the value of the X coordinate for that particular book image is reset to 1.

Figure 7:
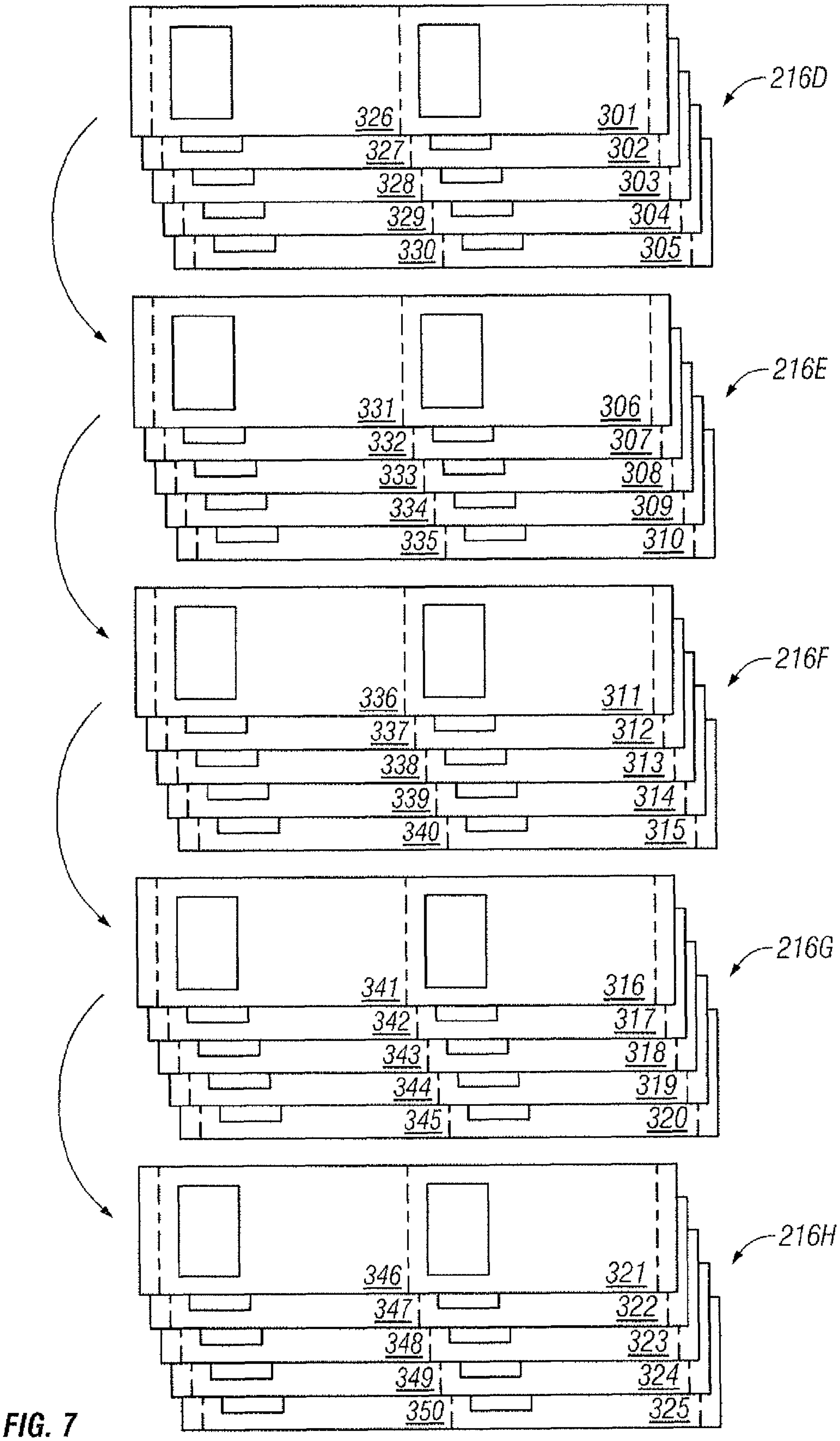
FIG. 7 shows the initial lots of rowcut sheets of another preferred embodiment of the present invention and the stacking order.
Figure 8:
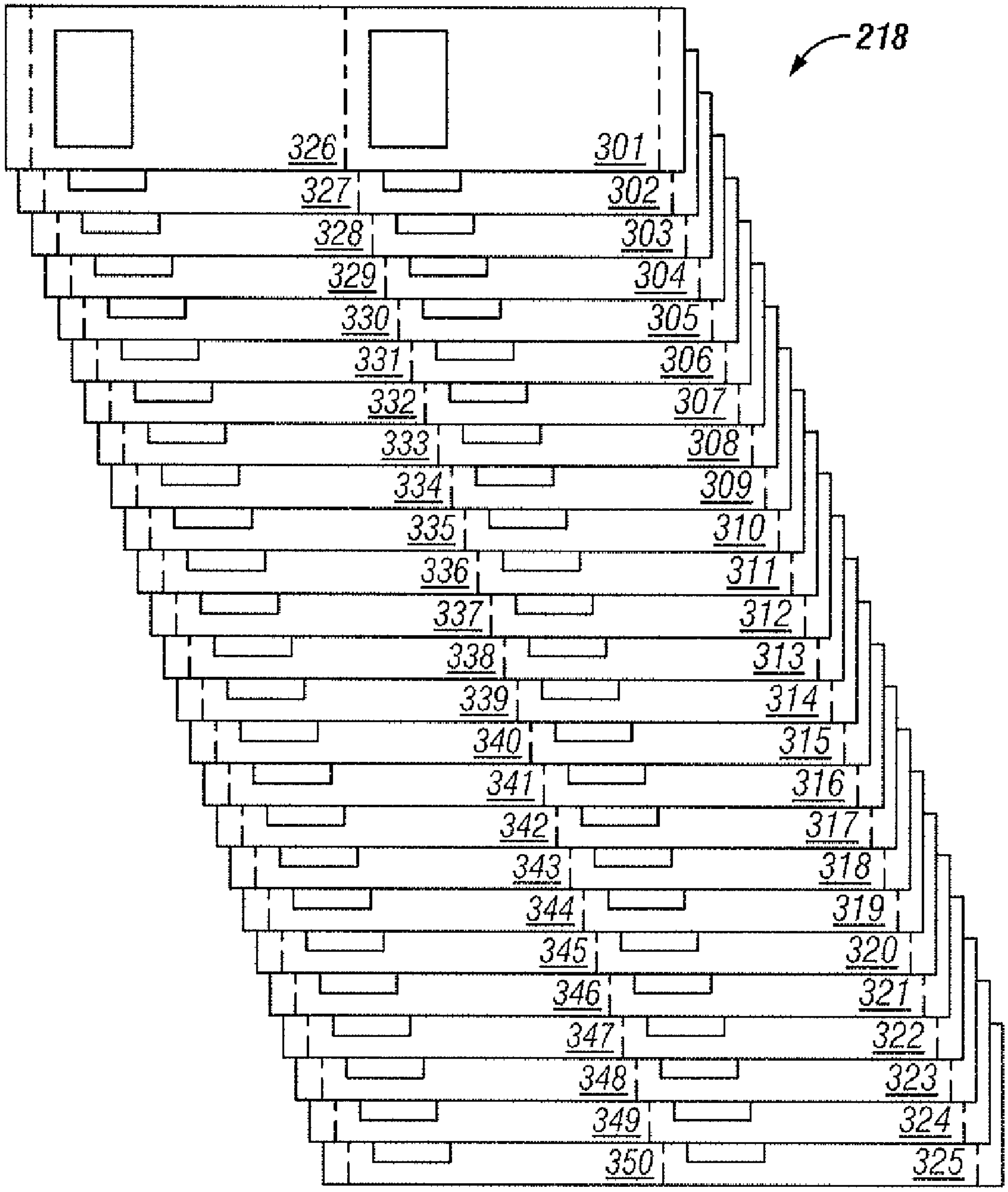
FIG. 8 depicts the final lot of rowcut sheets of another preferred embodiment of the present invention.
Figure 9:
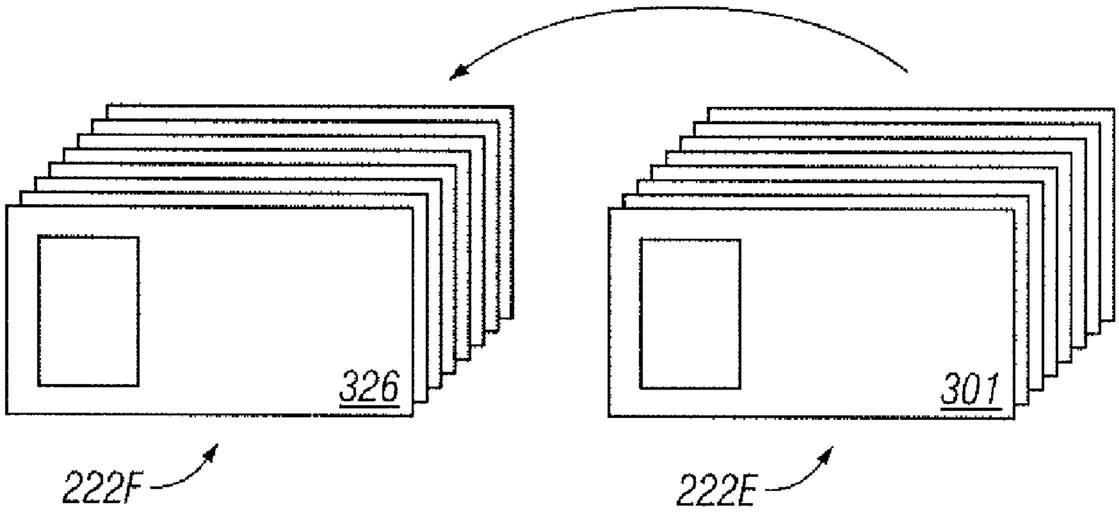
FIG. 9 shows the initial lots of individual frames of another preferred embodiment of the present invention and the stacking order.

Referring to FIGS. 7, 8 and 9, this preferred embodiment utilizes cutting and stacking steps that are similar to those used in the previous preferred embodiment. In this preferred embodiment, the row cut yields 5 initial rowcut lots 216D-216H instead of 3. Each initial rowcut lot 216 in this preferred embodiment is about 2 inches by about 6 inches. The initial rowcut lots 216D-216H in this preferred embodiment are stacked according to the stacking method of the previous preferred embodiment to produce a final rowcut lot 218. The final rowcut lot 218 also undergoes a final cut, which reduces the rowcut sheets to individual frames. Each initial frame lot 222E, 222F is stacked according to the method of the previous preferred embodiment to produce a final frame lot 224. The final flame lot 224 of this preferred embodiment is optionally covered and bound using the methods of the previous preferred embodiment.

I claim:

1. A method for making an animated flipbook, comprising:

capturing a series of individual images from a camera in electronic communication with a computer running a computer program, wherein said individual images progress chronologically through a time interval from a first individual image to a last individual image;

providing at least two sheets of paper with at least 2 individual frames on each said sheet of paper;

printing the individual images on the at least two sheets of paper in a predetermined order, with no more than one individual image printed inside each said individual frame, to produce at least two uncut sheets wherein said predetermined order allows said uncut sheets to be stacked to produce an uncut sheet lot having a top and a bottom, wherein the first individual image is on the top of the uncut sheet lot, and wherein each individual image is either on the top of the uncut sheet lot or directly beneath and adjacent to the individual image immediately preceding it chronologically, and wherein said computer program determines said predetermined order and instructs a printer to perform said printing step;

stacking said uncut sheets to produce said uncut sheet lot;

cutting said uncut sheet lot into rows of individual frames to produce at least two rowcut sheets;

stacking said rowcut sheets to produce a rowcut sheet lot having a top and a bottom, wherein the first individual image is on the top of the rowcut sheet lot, and wherein each individual image is either on top of the uncut sheet lot or directly beneath and adjacent to the individual image immediately preceding it chronologically;

cutting said rowcut sheets into said individual frames;

stacking said individual frames in chronological order to produce a frame lot, such that the individual frame containing the first individual image chronologically is on the top of said frame lot and the individual frame containing the last individual image chronologically is on the bottom of said frame lot;

binding a portion of said frame lot to produce an animated flipbook.

2. The method of claim 1 additionally comprising placing a cover over the frame lot before the binding step.

3. The method of claim 1 additionally comprising capturing said individual images over said time interval at a rate of about 10 individual images per second.

4. The method of claim 1 wherein the at least two individual images are captured from at least one panoramic photograph.

5. The method of claim 1 wherein the individual frames are rectangular in shape, having a first side length measuring about 2 inches and a second side length measuring about 3.5 inches.

6. The method of claim 1, wherein:

said capturing further comprises capturing sixty individual images;

said providing further comprises providing five sheets of paper having twelve individual frames arranged into three rows and four columns on each sheet of paper; and said cutting further comprises cutting said uncut sheets into rows of individual frames to produce fifteen rowcut sheets, with each rowcut sheet having four individual frames.

7. The method of claim 1 wherein:

said capturing further comprises capturing fifty individual images;

said providing further comprises providing five sheets of paper having ten individual frames arranged into five rows and two columns on each sheet of paper; and said cutting further comprises cutting said five uncut sheets into rows of individual frames to produce twenty five rowcut sheets, with each rowcut sheet having two individual frames.

* * * * *